United States Patent [19]
Visco et al.

[11] Patent Number: 5,162,175
[45] Date of Patent: Nov. 10, 1992

[54] CELL FOR MAKING SECONDARY BATTERIES

[76] Inventors: Steven J. Visco, 2336 California St., Berkeley, Calif. 94703; Meilin Liu, 1121C Ninth St., #29, Albany, Calif. 94710; Lutgard C. DeJonghe, 910 Acalanes Rd., Lafayette, Calif. 94549

[21] Appl. No.: 697,533

[22] Filed: Apr. 30, 1991

Related U.S. Application Data

[63] Continuation of Ser. No. 421,091, Oct. 13, 1989, abandoned.

[51] Int. Cl.[5] .............................. H10M 4/60
[52] U.S. Cl. ................... 429/192; 429/194; 429/213
[58] Field of Search ............... 429/192, 194, 213

[56] References Cited

U.S. PATENT DOCUMENTS

| | | | |
|---|---|---|---|
| 4,681,822 | 7/1987 | Berthier et al. | 429/213 |
| 4,833,048 | 5/1989 | Dejonghe et al. | 429/213 |

*Primary Examiner*—Brian E. Hearn
*Assistant Examiner*—Maria Nuzzolillo

[57] ABSTRACT

The present invention provides all solid-state lithium and sodium batteries operating in the approximate temperature range of ambient to 145° C. (limited by melting points of electrodes/electrolyte), with demonstrated energy and power densities far in excess of state-of-the-art high-temperature battery systems. The preferred battery comprises a solid lithium or sodium electrode, a polymeric electrolyte such as polyethylene oxide doped with lithium triflate ($PEO_8LiCF_3SO_3$), and a solid-state composite positive electrode containing a polymeric organosulfur electrode, $(SRS)_n$, and carbon black, dispersed in a polymeric electrolyte.

20 Claims, 2 Drawing Sheets

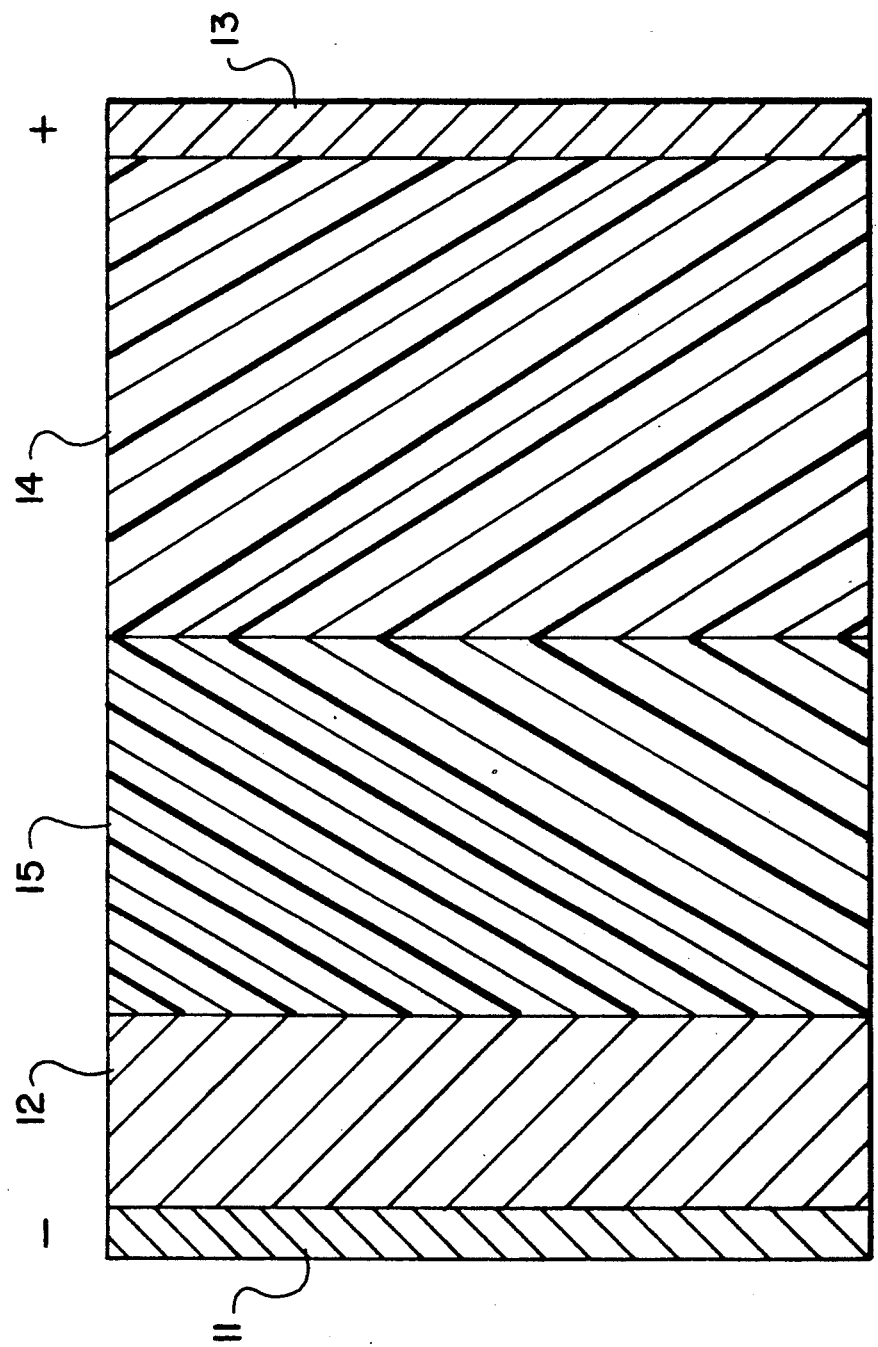

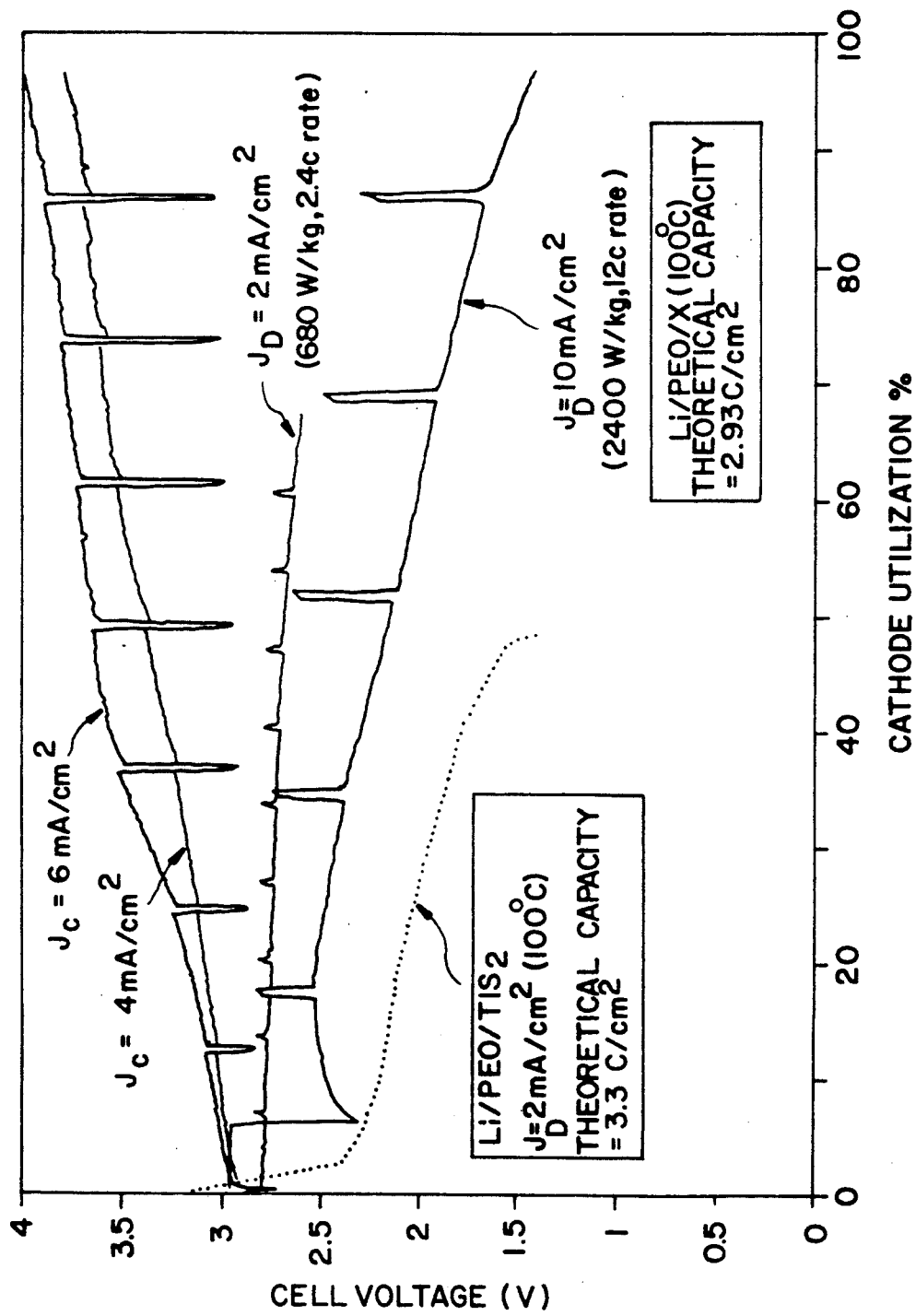

CELL FOR MAKING SECONDARY BATTERIES

The invention described herein arose in the course of, or under, Contract No. DE-AC03-76SF00098 between the United States Department of Energy and the University of California, and the United States Government has rights in the invention.

This is a continuation of copending application(s) Ser. No. 07/421,091 filed on Oct. 13, 1989 now abandoned.

BACKGROUND OF THE INVENTION

The present invention relates to metal-sulfur type cells for making secondary batteries, and particularly to cells operating with all components thereof in the solid state.

Secondary batteries are in widespread use in modern society, particularly in applications where large amounts of energy are not required. However, it is desirable to use batteries in applications requiring considerable power, and much effort has been expended in developing batteries suitable for such high power applications as electric vehicles. Of course, such batteries are also suitable for use in lower power applications such as cameras or portable recording devices.

At this time, the most common secondary batteries are probably the lead-acid batteries used in automobiles. These batteries have the advantage of being capable of operating for many charge cycles without any significant loss of performance. However, these batteries have a low power to weight ratio. In order to improve on weight ratios, lithium batteries have been thoroughly investigated, and certain of these systems are promising in certain applications. As improvements are made, it will be appreciated that more widespread use will follow.

Developments in lithium polyethylene oxide cells typically have a figure of merit (FOM), which is computed by multiplying the number of cycles by the mean cycle capacity and dividing by the excess installed lithium capacity, of about 50. A typical example of such a cell is to be found in U.S. Pat. No. 4,589,197 describing a lithium/polyethylene battery system in which the electroactive material is an intercalation compound. This type of battery has also been shown to be capable of scaling up to large sizes without any significant loss of performance.

Another lithium type cell is to be found in U.S. Pat. No. 4,833,048 which utilizes an organsulfur positive electrode which has sulfur-sulfur bonds in the charged state that are broken in the discharged state to form organomet salts. This patent discloses a cell which has an excellent weight ratio, however, the disclosed electrode was utilized in the liquid state and solvents were needed to provide the desired current transport. The present invention provides improvements over these patented systems. Specifically, the present invention provides a cell having a FOM of the order of 120 along with capability of operation at room or ambient temperatures.

SUMMARY OF THE INVENTION

Therefore, it is a primary object of the invention to provide a metal-sulfur type cell having a high figure of merit, and which is capable of operating at ambient temperatures.

Another object of the invention is to provide a cell in which all of the components are in the solid state, and which may be reliably fabricated into units having reproducible performance values.

A further object of the invention is to provide a battery having an energy to weight ratio far in excess of the demands for load leveling and/or electric vehicle applications.

These and other objects will become apparent as the specification continues.

In accordance with the invention, a composite positive electrode and a battery system constructed with the composite positive electrode system are provided. In the fully charged states the positive electrode comprises a 1-dimensional, 2-dimensional, or 3-dimensional polymeric electroactive component. In the one dimensional linear form this component can be formulated as $(SRS)_n$ in which R is an organic moiety as hereinafter defined and n is greater than 2 and preferably greater than 20 in the charged state. The half-cell reaction can be described as follows:

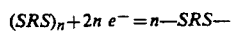

and the overall cell reaction can be described as follows:

In the most general sense, the electroactive component of the solid-state organosulfur electrode can be represented in the charged state by $(RS_y)_n$ wherein y is 2 to 6, n is greater than 2 and preferably greater than 20, and R is one or more different aliphatic or aromatic moieties having 1 to 20 carbon atoms, which may include one or more oxygen, phosphorus, silicon, sulfur or nitrogen heteroatoms when R comprises one or more aromatic rings, or one or more oxygen, phosphorus, silicon, sulfur, nitrogen or fluorine atoms associated with the chain when R comprises an aliphatic chain, wherein the aliphatic group may be linear or branched, saturated or unsaturated, and wherein either the aliphatic chain or the aromatic ring may have substituted groups thereon, and wherein said organosulfur positive electrode is further characterized by a large number of sulfur-sulfur bonds when in the charged state, which upon discharge of the cell are broken to form an organo-metal salt with metal ions in the cell.

The charge/discharge process in the positive electrode can be viewed as a reversible redox polymerization (or redox dimerization/scission in the case of monomeric RSSR compounds). An example of a 2-dimensional (ladder polymer) electrode can be illustrated by polyethyleneimine disulfide as follows:

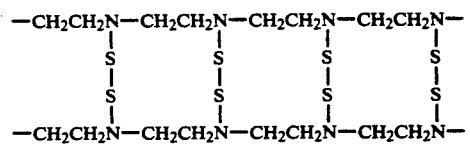

Although these polymeric electrode materials transport alkali metal ions, in most cases it will be necessary or desirable to include a suitable polymeric electrolyte such as polyethylene oxide for rapid ion transport within the electrode as is done with intercalation based electrodes. Furthermore, since the organosulfur electrodes are not electrically conductive, it is important to disperse a small amount of carbon black (typically 7% by weight), or equivalent conductor particles, in the composite electrode. The ranges of the materials in the polymeric positive electrode is from about 30% to 80% by weight of active organosulfur, from about 20% to about 70% by weight of polymeric electrolyte, and from about 1% to about 20% by weight of conductor particles.

The desired mixture is achieved by dissolving or dispersing the $(SRS)_n$ polymer, polyethylene oxide, and carbon black powder in acetonitrile, and subsequently evaporating the solvent to cast a thin film (say 10 to 200 microns) of solid composite electrode. In the preferred case, the positive electrode is a composite electrode composed of organosulfur redox polymer, polyethylene oxide, and carbon black.

In the fully charged state the organosulfur positive electrode is of the general formula $(SRS)_n$ with the important feature being the formation of the sulfur-sulfur bond upon oxidation of the alkali metal thio salt. The preferred electrode is a polymeric disulfide, but it is believed that monomeric disulfides (RSSR) as described in U.S. Pat. No. 4,833,048 will also be operative in solid state batteries. In the fully discharged state, the organosulfur electrode comprises polythio and/or dithio anions (—SRS—) dispersed in the polymer electrolyte matrix. The final discharge product depends, of course, on the type of R groups in the polymer chain and the dimensionality of the fully oxidized positive polymer electrode.

Another advantage of the invention resides in the capability of the solid state electrodes to be reversible to various metals. While lithium has the lowest equivalent weight and corresponding weight advantages, it is more costly than sodium. In addition, the conductivity of the preferred polyether electrolytes such as polyethylene oxide is higher for sodium transport than for lithium transport. Accordingly, while the intercalation type cells require lithium as a practical matter, the negative electrode of the present electrode may be composed of many different metals. Accordingly, any of the alkali or alkaline earth metals or transition metals (the polyether electrolytes have been shown to transport dications such as $Zn^{++}$) are within the ambit of the invention, and particularly mixtures containing lithium and/or sodium.

The electrolyte used in the cells of this invention functions as a separator for the electrodes and as a transport medium for the metal ions. Therefore, any solid material capable of transporting metal ions may be used. For example, it has been shown that sodium beta alumina is operative. Preferably, however, the solid electrolyte separator is any suitable polymeric electrolyte such as polyethers, polyimines, polythioethers, polyphosphazenes, polymer blends, and the like in which an appropriate electrolyte salt has been added.

BRIEF DESCRIPTION OF THE DRAWING

FIG. 1 is a cross-sectional view of the main components of a cell constructed according to the invention.

FIG. 2 shows data in graphical form illustrating the operation of one embodiment of the invention and comparing it with data of a prior art embodiment.

DETAILED DESCRIPTION OF THE INVENTION

The metal-sulfur type cell as shown in FIG. 1 comprises a current collector 11 in juxtaposition to a negative electrode 12, a current collector 13 in juxtaposition to a positive electrode 14, and an electrolyte 15 sandwiched between the negative electrode 12 and the positive electrode 14. In a typical cell all of these components will be enclosed in a suitable case of plastic or the like (not shown) with only the current collectors extending beyond the enclosure. In this way, reactive metals such as sodium or lithium in the negative electrode are protected. Similarly, protection is provided for the other parts of the cell.

Suitable battery constructions may be made according to the known art for assembling cell components and cells as desired, and any of the known configurations may be fabricated utilizing the invention. The exact structures will depend primarily upon the intended use for the battery unit. However, it will be appreciated that the cell units are all in a substantially solid state at ambient temperatures and in operation.

Referring again to FIG. 1, current collectors 11 and 13 are sheets of conductive material such as stainless steel which remain substantially unchanged during discharge and charge of the cell, and which provide current connections to the cathode and anode of the cell. Negative electrode 12 is preferably an alkali metal such as lithium or sodium with sodium being preferred over lithium. The organo-sulfur cathode or positive electrode 14 is formed onto the current collector 13 as described above, and the entire unit pressed together with the electrolyte 15 sandwiched between electrodes as shown.

In the drawing, the thicknesses of all of the cell components are exaggerated for the sake of illustration, and all of these components are typically rather thin sheets. For example, a typical lithium or sodium solid anode 12 will be about 10 to 50 microns thick, a typical solid composite polymeric cathode 14 will be about 50 to 100 microns thick, and a typical PEO electrolyte 15 will be about 10 to 100 microns thick.

The preferred electrolyte is a polyalkylene oxide such as polyethylene oxide into which a plasticizing electrolyte salt such as $LiN(CF_3SO_2)_2$ has been added. The effect of the plasticizing electrolyte salt is to maintain the polyether in the amorphous (conductive) state at low temperatures, thereby allowing low temperature operation of the cell.

In accordance with the invention, the organo-sulfur compound which comprises the novel positive electrode of the invention is characterized by an organosulfur material having at least one sulfur atom which forms a first bond with an organic moiety and a second bond, when the material is in its charged state, with another sulfur atom which is also bonded to an organic moiety. When the compound is in its discharged state, the sulfur-sulfur bond is broken and a metal ion, such as sodium, forms a salt with each of the resulting organosulfur anions.

Thus, the positive electrode material comprises an organo-sulfur material which includes the basic or backbone formula R—S—. In its charged state, the sulfur atom (or atoms, as will be explained below) forms a —S—S—bond with a sulfur atom of another R—S— group forming R—S—S—R. Upon discharge, the S—S—bond is broken and each R—S—group forms a salt with a metal ion such as, for example, sodium, i.e., R—S—Na.

The R group, representing an organic moiety, as will be explained below, may also have sulfur atoms bonded thereto by double bonds, i.e., R=S, as well as the sulfur atoms just described. The R group may also have more than one sulfur atom bonded thereto by single bonds thus making polymerization possible, for example in the case of —S—R—S—. Branching may also occur when the R group has three or more of such sulfur atoms single bonded thereto.

Therefore, the general formula for the organosulfur material comprising the novel positive electrode of the invention, may be written, in its charged state, as: $(R(S)_y)_n$ wherein y is 2 to 6; n is greater than 20; and R is one or more of the same or different aliphatic or aromatic organic moieties having 1 to 20 carbon atoms, which may include one or more oxygen, sulfur, phosphorus, silicon, or nitrogen heteroatoms when R comprises one or more aromatic rings, or one or more oxygen, phosphorus, silicon, sulfur, nitrogen, or fluorine atoms associated with the chain when R comprises an aliphatic chain, wherein the aliphatic group may be linear or branched, saturated or unsaturated, and wherein either the aliphatic chain or the aromatic ring may have substituted groups thereon.

When n in the general formula $(R(S)_y)_n$ is greater than 2, at least some of the organo-sulfur positive electrode material comprises organic moieties containing more than one sulfur atom, attached to the same organic moiety, and capable of forming a sulfur-sulfur bond with a sulfur attached to another organic moiety. Thus, in its charged state, a polymer-like material may be formed with the length of the polymer depending upon the presence of impurities or chain stoppers such as mono sulfide organic moieties, e.g., $CH_3$—$CH_2$—S—Na, to terminate polymerization. Such a polymer, for example, could comprise a linear aliphatic chain having such a sulfur atom at each end of the chain, e.g., —S—$CH_2CH_2$—S—, permitting the formation of dimers, oligomers, etc, such as, —S—$CH_2$—$CH_2$—S—S—$CH_2$—$CH_2$—S—S—$CH_2$—$CH_2$—S—, corresponding to the general formula $(R(S)_2)_3$.

Similarly, the organo-sulfur compounds may comprise branched polysulfide materials containing more than two sulfurs capable of forming sulfur-sulfur bond with adjacent sulfur atoms on other organo-sulfur materials. For example, when each R group contains three sulfur atoms capable of forming sulfur-sulfur bonds, the general formula could be written as $(R(S)_3)_n$.

Thus, y has been given a value of 2 to 6 in the general formula in recognition of both the possibility of the existence of double bonded sulfur atoms on the R group as well as the presence of more than one sulfur atom thereon capable of forming sulfur-sulfur bonds with similar sulfur atoms on other molecules. The value of n in the general formula, while preferably greater than 20, has been given a range including 2 to 20 in recognition of the possibility of the lower stages of polymerization, such as by ring formation, and because solid-state batteries have advantages with organosulfur compounds that do not polymerize. No upper limit was placed upon n because the degree of polymerization is limited under charging conditions by the nature of the organosulfur compound used.

The oxidation-reduction chemistry of the organo-sulfur electrode is explained fully in U.S. Pat. No. 4,833,048, and the pertinent text therein is incorporated by reference. The present invention, while using similar organosulfur electrodes differs by operating at lower temperatures at solid state. Accordingly, the present invention prefers organosulfur polymer which are in excess of 20 monomer units and preferably higher than 50 units. In addition, the positive electrode of this invention differs from that of the cited patent by utilizing special current transport additives.

The operating temperature of the solid-state cells is in the range of $-40°$ to $145°$ C., limited in the high range by the melting point of either electrode or the electrolyte. The preferred temperature range is from ambient to $100°$ C. Sodium negative electrodes are limited to temperatures below $98°$ C., but, sodium alloy electrodes such as $Na_4Pb$ can be used at solid form at well over $100°$ C.

The use of a solid polymeric electrolyte and a solid redox polymerization cathode makes it possible to manufacture all-solid-state without the difficulties associated with the use of rigid or liquid electrolytes. The adhesiveness and elastomerity of the solid polymeric electrolyte and solid redox polymerization cathode prevent loss of or serious reduction of electrical contact between the solid electrolyte and the electrodes during cell cycling. In addition, the invention provides improvements over the state of the art by replacement of certain liquid and corrosive materials with solid and safer compositions. This replacement makes batteries utilizing the invention far easier to manufacture and package by highly automated processes, and provides cells that are non-corrosive to containment materials.

The following examples of laboratory testing will serve to further illustrate the invention.

Laboratory batteries were assembled with a sodium negative electrode, sodium beta" alumina electrolyte, and a positive electrode made with $(SRS)_n$, polyethylene oxide and carbon particles. The $(SRS)_n$ polymer used was a polymer of 2,5 dimercapto 1,3,4 thiodiazole, and three units of the polymer are shown in the following structure:

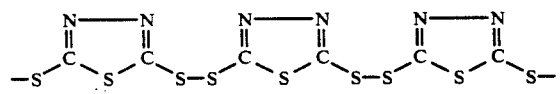

The composite positive electrodes were cast to a thickness of approximately 100 microns, which translates to about 0.0115 g/cm² of electrode surface area. The available capacity of the 100 micron polymer films was about 6.4 coulombs/cm² or 1.8 mAh/cm². The assembled cells were cycled to an end point of 6 coulombs (defined as 100% of capacity). These cells were charged and discharged at a variety of temperatures and current densities for a total of 80 cycles with absolutely no discernible evidence of deterioration of performance. At an operating temperature of 130° C., the cells could be discharged to 100% of available capacity at a current density of 4 mA/cm², and could be completely recharged at a current density of 3 mA/cm², with no adverse effects on subsequent cycles. Furthermore, the cells could be discharged at rates as high as 10 mA/cm² to 50% of available capacity, and charged at rates as high as 6 mA/cm² for 65% of available capacity. Moreover, these exceptionally high charge/discharge current densities did not harm the integrity of the solid polymer electrode. The results of these studies demonstrated the reversibility and reliability of the solid redox polymerization electrodes, even under harsh electrochemical conditions.

Cells made with lithium negative electrodes, polyethylene oxide electrolyte, and positive electrodes made with $(SRS)_n$ polymer, polyethylene oxide and carbon particles were constructed to test the actual performance of thin film batteries constructed according to the invention. The solid electrolyte used in these cells was polyethlene oxide doped with lithium triflate (LiCF$_3$SO$_3$), lithium perchlorate (LiClO$_4$), or other appropriate electrolyte salt. The concentration of electrolyte salt was 8 PEO monomer units (CH$_2$CH$_2$O) per molecule of salt, abbreviated herein as PEO$_8$LiX where X is the salt anion. The organosulfur polymer used was identical to that described above for the sodium cell.

Composite positive electrodes were constructed as described above for the sodium-based cell, except that two thicknesses of electrode were cast; a high capacity 6 coulomb/cm$^2$ film (100 microns), and a lower capacity 3 coulombs/cm$^2$ film (50 microns) for high power density batteries. These Li/PEO/[(SRS)$_n$/PEO/C] cells had theoretical energy densities of 1000 Wh/kg, and assembled cells had practical energy densities of 338 Wh/kg (zero current drain) for the high capacity films, and 304 Wh/kg for the low capacity films, based on the weight of the actual electrodes, PEO films, and a 4:1 excess of lithium (actual cells had a larger excess of lithium). These cells were charged and discharged at two different discharge levels for a total of 350 cycles. The first 100 cycles were discharged to depth 80% of capacity, and the remaining 250 cycles were discharged to a depth of 50% capacity. The demonstrated power densities and energy densities were exceptionally high and exceed all known solid-state intercalation compound-based batteries, as can be seen from the table below. These cells also outperform cells which operate at much higher temperatures such as the Na/beta''-alumina/S cell (350° C.), Li/LiCl/KCl/FeS$_2$ cell (450° C.), and the like.

TABLE

| Battery | Theoretical Energy Density Wh/kg | Practical Energy Density Wh/kg | Volumetric Energy Density Wh/l | Power Density W/kg | Power Density W/l |
|---|---|---|---|---|---|
| Li/PEO/(SRS)$_n$ | 1000 (OCV = 3.0) | 300 at zero current | 280 | 160 350 cycles | 144 |
| | | 264 at 0.5 mA/cm$^2$ 350 cycles | | 2400 1 cycle 100% util. | 2200 for 5 min. |
| Li/PEO/TiS$_2$ | 480 (OCV = 2.1) | 120 | 150 | 100 | 1500 5 sec |
| Cd/NiOOH | 245 | 35 | | | |

In FIG. 2, comparison data between Li/PEO/X and Li/PEO/TiS$_2$ is shown graphically. In the graph, J$_C$ shows the cell under charge and J$_D$ shows the cell under discharge. The test was computer controlled, and the peaks were printed during short off-times. Accordingly, the true data lines are obtained by smoothing off these peaks. As shown in the graph, the cells of the invention maintained their voltage well through the discharge period, whereas the comparison cell fell off rapidly. In addition, the cells of the invention were rechargeable from close to utilization of 100% of the cathode.

From the foregoing description, it is seen that the invention provides high specific energy and power cells that exceeds that of highly developed systems now known and in use. At the same time, the high energy and power are available at room temperature or ambient operation.

What is claimed is:

1. A solid state metal-sulfur cell which comprises:
   a) a solid metallic anode;
   b) a solid organo-sulfur cathode comprising, in the charged state, a polymer having the formula (R(S)$_y$)$_n$ wherein y=2 to 6, n is greater than 20, and R is one or more of the same or different aliphatic or aromatic moieties having 1 to 20 carbon atoms, which may include one or more oxygen, sulfur, or nitrogen heteroatoms when R comprises one or more aromatic rings, or one or more oxygen, sulfur, nitrogen, or fluorine atoms associated with the chain when R comprises an aliphatic chain, wherein the aliphatic group may be linear or branched, saturated or unsaturated, and wherein either the aliphatic chain or the aromatic ring may have substituted groups thereon and wherein said organo-sulfur positive electrode material is further characterized by a sulfur-sulfur bond, when in the charged state, which, upon discharge of the cell, is broken to form an organo-sulfur metal salt with metal ions in said cell; and
   c) an electrolyte separator between said anode and said cathode capable of ionic transport between said anode and cathode comprising an organic polymer and an electrolytic salt.

2. The cell of claim 1 wherein said solid metallic anode comprises a metal selected from the group consisting of alkali metals and alkaline earth metals.

3. The cell of claim 1 wherein said solid metallic anode comprises a metal selected from the group consisting of lithium and sodium.

4. The cell of claim 1 wherein said solid metallic anode comprises lithium.

5. The cell of claim 1 wherein said solid metallic anode comprises sodium.

6. The cell of claim 1 wherein said solid organo-sulfur cathode further comprises from 0 wt. % to 20 wt. % conductor particles.

7. The cell of claim 6 wherein said solid organo-sulfur cathode comprises from 0 wt. % to 10 wt. % carbon particles.

8. The cell of claim 6 wherein said solid organo-sulfur cathode comprises from 0 wt. % to 70 wt. % polymeric electrolyte.

9. The cell of claim 8 wherein said solid organo-sulfur cathode comprises from 0 wt. % to 70 wt. % polyalkylene oxide polymer.

10. The cell of claim 1 wherein said solid organo-sulfur cathode comprises:
   a) from about 1 wt. % to about 20 wt. % of conductor particles;
   b) from about 20 wt. % to about 70 wt. % of polymeric electrolyte; and c) the balance consisting essentially of, in the charged state, said organo-sulfur polymer having said formula $(R(S)_y)_n$.

11. The cell of claim 1 wherein said organic polymer, in said electrolyte separator between said anode and said cathode, is selected from the group consisting of polyethers, polyimines, polythioethers, polyphosphazenes, and mixtures of same.

12. The cell of claim 1 wherein said organic polymer, in said electrolyte separator between said anode and said cathode, comprises polyalkylene oxide.

13. The cell of claim 12 wherein said organic polymer comprises polyethylene oxide.

14. The cell of claim 1 wherein said electrolytic salt, in said electrolyte separator between said anode and said cathode, comprises lithium triflate.

15. A solid metal-sulfur cell which comprises:
a) a solid lithium anode;
b) a solid organo-sulfur cathode comprising, in the charged state, a polymer having the formula $(R(S)_y)_n$ wherein y=2 to 6, n is greater than 20, and R is one or more of the same or different aliphatic or aromatic moieties having 1 to 20 carbon atoms, which may include one or more oxygen, sulfur, or nitrogen heteroatoms when R comprises one or more aromatic rings, or one or more oxygen, sulfur, nitrogen, or fluorine atoms associated with the chain when R comprises an aliphatic chain, wherein the aliphatic group may be linear or branched, saturated or unsaturated, and wherein either the aliphatic chain or the aromatic ring may have substituted groups thereon and wherein said organo-sulfur positive electrode material is further characterized by a sulfur-sulfur bond, when in the charged state, which, upon discharge of the cell, is broken to form an organo-sulfur metal salt with metal ions in said cell; and
c) an electrolyte separator between said anode and said cathode capable of ionic transport between said anode and cathode comprising an organic polymer and an electrolytic salt.

16. A solid state metal-sulfur cell which comprises:
a) a solid metallic anode;
b) a solid organo-sulfur cathode comprising, in the charged state, a polymer having the formula $(R(S)_y)_n$ wherein y=2 to 6, n is greater than 20, and R is one or more of the same or different aliphatic or aromatic moieties having 1 to 20 carbon atoms, which may include one or more oxygen, sulfur, or nitrogen heteroatoms when R comprises one or more aromatic rings, or one or more oxygen, sulfur, nitrogen, or fluorine atoms associated with the chain when R comprises an aliphatic chain, wherein the aliphatic group may be linear or branched, saturated or unsaturated, and wherein either the aliphatic chain or the aromatic ring may have substituted groups thereon and wherein said organo-sulfur positive electrode material is further characterized by a sulfur-sulfur bond, when in the charged state, which, upon discharge of the cell, is broken to form an organo-sulfur metal salt with metal ions in said cell; and
c) an electrolyte separator between said anode and said cathode capable of ionic transport between said anode and cathode comprising an electrolytic salt, and an organic polymer selected from the group consisting of polyethers, polyimines, polythioethers, polyphosphazenes, and mixtures of same.

17. A solid state metal-sulfur cell which comprises:
a) a solid lithium anode;
b) a solid organo-sulfur cathode comprising, in the charged state, a polymer having the formula $(R(S)_y)_n$ wherein y=2 to 6, n is greater than 20, and R is one or more of the same or different aliphatic or aromatic moieties having 1 to 20 carbon atoms, which may include one or more oxygen, sulfur, or nitrogen heteroatoms when R comprises one or more aromatic rings, or one or more oxygen, sulfur, nitrogen, or fluorine atoms associated with the chain when R comprises an aliphatic chain, wherein the aliphatic group may be linear or branched, saturated or unsaturated, and wherein either the aliphatic chain or the aromatic ring may have substituted groups thereon and wherein said organo-sulfur positive electrode material is further characterized by a sulfur-sulfur bond, when in the charged state, which, upon discharge of the cell, is broken to form an organo-sulfur metal salt with metal ions in said cell; and
c) an electrolyte separator between said anode and said cathode, capable of ionic transport between said anode and cathode, comprising one or more polyether polymers and an electrolytic salt.

18. The cell of claim 17 wherein said polyether polymer, in said electrolyte separator between said anode and said cathode, comprises polyethylene oxide.

19. The cell of claim 17 wherein said electrolytic salt, in said electrolyte separator between said anode and said cathode, comprises lithium triflate.

20. The cell of claim 17 wherein said solid organo-sulfur cathode comprises:
a) from about 1 wt. % to about 20 wt. % of conductor particles;
b) from about 20 wt. % to about 70 wt. % of a polymeric electrolyte; and
c) the balance consisting essentially of, in the charged state, said organo-sulfur polymer having said formula $(R(S)_y)_n$.

* * * * *